G. E. King.

Puffing for Trimming.

No. 3,001. Reissued Jun. 23, 1868.

Witnesses:
A. Leclerc.
E. P. Tracy.

Inventor:
G. E. King.
per Brown Coombs & Co
Attys.

N. PETERS, PHOTO-LITHOGRAPHER, WASHINGTON, D. C.

UNITED STATES PATENT OFFICE.

GEORGE EDWIN KING, OF NEW YORK, N. Y.

IMPROVEMENT IN FLUTED PUFFING.

Specification forming part of Letters Patent No. 62,492, dated February 26, 1867; reissue No. 3,001, dated June 23, 1868.

DIVISION B.

*To all whom it may concern:*

Be it known that I, GEORGE EDWIN KING, of the city, county, and State of New York, have invented a new and Improved Puffing, of which the following is a full, clear, and exact description, reference being had to the accompanying drawing, forming part of this specification, and in which—

Figure 2:
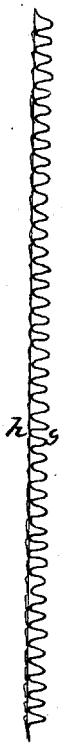
Figure 1:
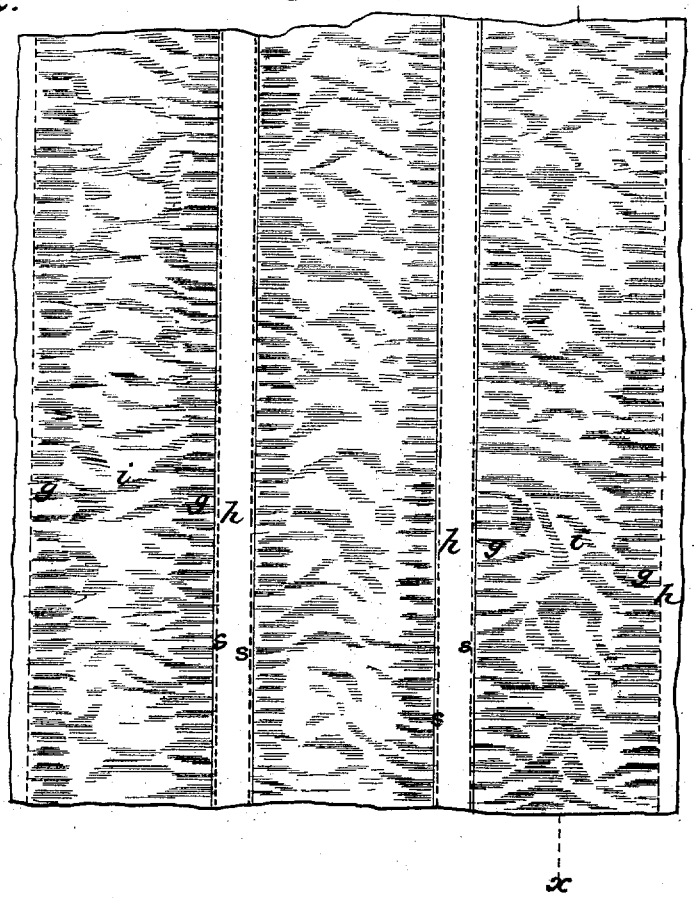
Figure 3:
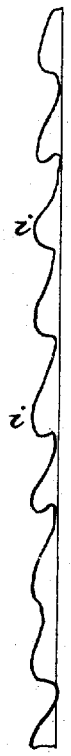

Figure 1 represents a face view of my improved puffing; Fig. 2, an outside edge view of the same; and Fig. 3 a longitudinal section, taken as indicated by the line *x x* in Fig. 1.

Similar letters of reference indicate corresponding parts.

My invention consists in the production, as a new article of manufacture, of a puffing, applicable to shirt-bosoms, trimming, or other purposes of dress, in which the completed article, prior to laundering or washing, is made up of either a single row, or two or more parallel series or rows, each consisting of flattened borders, with flutes running along their inner edges, and a puffed or gathered or crinkled surface or surfaces between the flutes.

Referring to the accompanying drawing, the puffing there represented consists of flattened portions *h*, with flutes *g* arranged along the inside edges of such flattened parts or borders, and with a crinkled or gathered surface, *i*, to the portion lying between the flutes, longitudinal rows of stitching, *s*, being afterward, it may be, passed through the flattened borders *h*, at, say, their edges, to render permanent the conformation of the puffing, and, if necessary, strips or tapes, basted on or along such flattened parts.

Where the material is of sufficient width to form two or more parallel rows of puffed, gathered, or crinkled portions, *i*, with fluted borders *g*, separated by plain surfaces or borders *h*, then the article so formed may, if desired, be divided into narrow pieces or strips of puffing, by cutting the same longitudinally through the flattened portions *h*, in direction of their length.

The mechanism, where machinery is used for the purpose, necessary to produce a puffing of this character, may be varied; but for the purpose of illustrating how, or one way in which the same may be done automatically or by mechanism, it will suffice here to refer briefly to a machine for the purpose which was secured to me by Letters Patent, No. 62,492, of the United States, bearing date February 26, 1867, and which is now the subject of an application for reissue. Thus, the piece of muslin or other fabric may be entered through a hollow inclined guide, formed partly of an arched and partly of a straight form, to or between rollers and pressers, the rollers being made with flattened ends or portions that act in concert with the pressers, to form the flat portions *h* of the puffing, and with grooves or flutes inside of such flattened ends, to establish the flutes *g*, while the intervening portions of the rollers opposite the arched portion or portions of the guide are farther from each other, and simply serve to act in a light manner upon the curved surfaces of the puffed, gathered, or crinkled portions *i* of the material as produced by or through the arched portions of the guide that give an irregular or wavy surface to such portions, by reason of the width of the material passing out of or through the arched portions of the guide being greater than the distance between the fluted portions of the roller.

The longitudinal rows of stitching *s*, in or along the flattened portions *h*, may either be put in by hand or by any suitable sewing-machine.

A puffing is thus made, having gathered, crinkled, or wavy portions *i*, without having recourse to laundering or washing to effect such conformation, thereby economizing labor and material, and putting the article in a finished state on the market in that fresh condition which washed goods are devoid of.

What is here claimed, and desired to be secured by Letters Patent, is—

The within-described puffing, as a new article of manufacture, the same being formed by crinkling, gathering, or irregularly waving one portion of the strip of muslin or other material simultaneously with fluting it along the edges of such portion, as at *g*, and forming flattened borders or portions *h* outside of the flutes, or between two next adjacent rows of them, to receive stitching, substantially as specified.

GEO. E. KING.

Witnesses:
EDWD. P. TRACY,
A. LE CLERC.